United States Patent
Lorenz et al.

[11] 3,760,041
[45] Sept. 18, 1973

[54] O-(N-ALKOXY-BENZIMIDOYL)-(THIONO)PHOSPHORIC(PHOSPHONIC) ACID ESTERS

[76] Inventors: Walter Lorenz, c/o Farbenfabriken Bayer Aktiengesellschaft, Wuppertal-Cronenberg; Ingebog Hammann; Wolfgang Behrenz, both of c/o Farbenfabriken Bayer Aktiengesellschaft, Cologne; Wilhelm Stendel, c/o Farbenfabriken Bayer Aktiengesellschaft, Wupertal-Elberfeld, all of Germany

[22] Filed: Oct. 20, 1971

[21] Appl. No.: 191,072

[30] Foreign Application Priority Data
Oct. 26, 1970 Germany.................. P 20 52 379.4

[52] U.S. Cl.................. 260/944, 260/973, 424/211
[51] Int. Cl........... C07f 9/08, C07f 9/16, C07f 9/40
[58] Field of Search............................ 260/944, 945

[56] References Cited
UNITED STATES PATENTS
3,597,508   8/1971   Richter et al...................... 260/944

FOREIGN PATENTS OR APPLICATIONS
1,141,277   12/1965   Germany............................ 260/944

OTHER PUBLICATIONS
Hilgetag et al. Chemical Abstracts, 63 page 7037 (1965).

Primary Examiner—Lewis Gotts
Assistant Examiner—Richard L. Raymond
Attorney—Burgess et al.

[57] ABSTRACT

O-(N-alkoxy-benzimidoyl)-(thiono)phosphoric (phosphonic) acid esters of the general formula

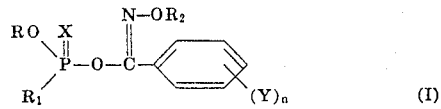

in which
R and $R_2$ each is an alkyl radical of one to six carbon atoms,
$R_1$ is an alkyl or alkoxy radical of one to six carbon atoms,
X is an oxygen or sulfur atom,
n is an integer from 0 to 5, and
Y is a halogen atom, an alkyl radical of one to four carbon atoms or a nitro group,
which possess insecticidal, and acaricidal properties.

7 Claims, No Drawings

O-(N-ALKOXY-BENZIMIDOYL)-(THIONO) PHOSPHORIC(PHOSPHONIC) ACID ESTERS

The present invention relates to and has for its objects the provision of particular new 0-(N-alkoxy-benzimidoyl)-(thiono)phosphoric(phosphonic) acid esters, i.e. 0,0-dialkoxy-0-(N-alkoxy-benzimidoyl)-phosphoric acid esters optionally substituted on the benzene ring with up to five halogen, alkyl and/or nitro radicals, the corresponding alkanephosphonic acid esters, and their thiono analogues, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specification No. 1,141,277 that S-(N-alkylbenzimidoyl)-(thiono)thiolphosphoric acid esters, such as 0,0-diethyl-S-(N-methyl-benzimidoyl)-thionothiolphosphoric acid ester (Compound A), exhibit an insecticidal and acaricidal activity.

The present invention provides, as new compounds, the 0-(N-alkoxy-benzimidoyl)-(thiono)phosphoric(phosphonic) acid esters of the general formula

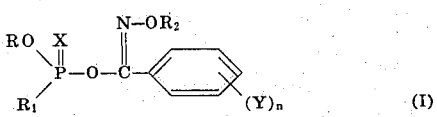

in which
R and R$_2$ each is an alkyl radical of one to six carbon atoms,
R$_1$ is an alkyl or alkoxy radical of one to six carbon atoms,
X is an oxygen or sulfur atom,
n is an integer from 0 to 5, and
Y is a halogen atom, an alkyl radical to one to four carbon atoms or a nitro group.

These new compounds have been found to possess strong insecticidal and acaricidal (including tickicidal) properties.

The present invention also provides a process for the preparation of a compound of the formula (I) above, in which an N-alkoxy-benzhydroxamic acid derivative of the general formula

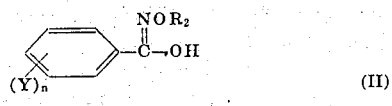

is reacted, in the form of an alkali metal, alkaline earth metal or ammonium salt thereof or in the presence of an acid-binding agent, with a (thiono)phosphoric(phosphonic) acid ester halide of the general formula

in which formulas
R, R$_1$, R$_2$, X, Y and n have the meanings stated above, and Hal is a halogen atom, preferably a chlorine atom.

Surprisingly, the 0-(N-alkoxy-benzimidoyl)-(thiono)-phosphoric(phosphonic) acid esters of the present invention show a considerably better insecticidal and acaricidal activity than the known S-(N-alkylbenzimidoyl)-(thiono)thiolphosphoric acid esters of analogous constitution and of the same directions of activity. The compounds according to the present invention therefore represent a genuine enrichment of the art.

It 0,0-dimethyl-thionophosphoric acid ester chloride and N-ethoxybenzhydroxamic acid are used as starting materials, the reaction course can be represented by the following equation:

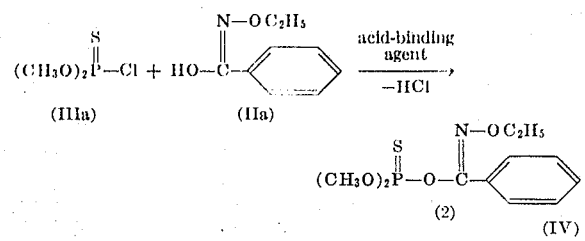

Preferably, in formula (I) as in formulas (II) and (III), R and R$_1$ each denotes a straight-chain or branched lower alkyl radical with one to four carbon atoms, namely methyl, ethyl, n- or isopropyl or n-, iso-, sec.- or tert.-butyl, R$_1$ alternatively denoting a lower alkoxy radical with one to four carbon atoms, namely methoxy, ethoxy, n- or iso-propoxy or n-, iso-, sec.-tert.- butoxy; R$_2$ preferably denotes methyl, ethyl or n- or isopropyl; n is preferably 1, 2 or 3, and each Y, which may be different from one another, is preferably chlorine, bromine, methyl, ethyl or nitro.

As examples of the (thiono)phosphoric(phosphonic) acid ester halides and N-alkoxybenzhydroxamic acid derivatives that may be used in the preparative process of this invention, there may be metnioned:
0,0-dimethyl-, 0,0-diethyl-, 0,0-dipropyl-, 0,0-diisopropyl-, 0-methyl-0-ethyl, 0-methyl-0-isopropyl-, 0-ethyl-0-isopropyl-, 0,0-dibutyl-, 0-tert.-butyl-0-methyl-, 0-butyl-0-ethyl-, 0-butyl-0-isopropyl and 0,0-di-tert.-butyl-phosphoric acid ester chlorides and the corresponding thiono analogues; 0-methyl-methane-, 0-ethyl-propane-, 0-isopropyl-ethane, 0-butyl-methane-, 0-methyl-isopropane-, 0-methyl-ethane-, 0-ethyl-ethane-, 0-propyl-methane-, 0-butyl-ethane-, 0-tert.-butyl-methane-, 0-ethyl-butane-, 0-isopropyl-butane-, 0-butyl-butane-0ethyl-methane-phosphonic acid ester chlorides and the corresponding thiono compounds; and
N-methoxy-3,5-dinitro-, N-ethoxy-3,5-dinitro-, N-isopropoxy-3,5-dinitro-, N-methoxy-3,5-dichloro-, N-ethoxy-3,5-dichloro-, N-propoxy-3,5-dichloro-, N-methoxy-2-chloro-, N-methoxy-3-chloro-, N-methoxy-5-chloro-, N-isopropoxy-2-chloro-, N-iso-propoxy-4-chloro-, N-isopropoxy-2-bromo-, N-methoxy-4-bromo-, N-methoxy-3-bromo-, N-methoxy-4-nitro-, N-propoxy-4-nitro-, N-isopropoxy-4-nitro-, N-methoxy-4-methyl-, N-methoxy-4-ethyl, N-methoxy-4-isopropyl-, N-propoxy-4-methyl-, N-isopropoxy-4-ethyl and N-isopropoxy-4-propyl-benzhydroxamic acids.

The (thiono)phosphoric(phosphonic) acid ester halides to be used as starting materials are known from the literature and can, like the N-alkoxybenzhydroxamic acid derivatives, be prepared by generally known processes, the latter, for example, being prepared from the corresponding benzhydroxamic acids with alcoholic solutions of potassium hydroxide and an alkyl iodide (Waldstein, Annalen der Chemie, 181, 385) or from benzoyl chlorides and alkoxylamines (Gierke, Annalen der Chemie, 205, 278).

The preparative process is preferably carried out with the use of suitable solvents and diluents. As such, practically all inert organic solvents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones, for example acetone, and methylethyl, methyl-isopropyl and methyl-isobutyl ketones; and nitriles, such as acetonitrile and propionitrile.

As acid-binding agents, all customary acid-acceptors can be used. Particularly good results have been obtained with alkali metal carbonates and alcoholates, such as sodium and potassium carbonates, methylates and ethylates, as well as with aliphatic, aromatic or heterocyclic amines, for example triethylamine, dimethylamine, dimethylaniline, dimethylbenzylamine and pyridine.

The reaction temperature can be varied within a fairly wide range. In general, the work is carried out at from about 0° to 120°C, preferably at from about 40° to 70°C.

The reaction is, in general, carried out at normal pressure.

For the carrying out of the process, the starting materials are in most cases used in equimolar amounts. An excess of one or the other of the reactants brings no substantial adavantages. The reaction is preferably carried out in the presence of one of the above-mentioned solvents, as well as in the presence of an acid-acceptor, within the temperature range stated, and the reaction mixture, after several hours' stirring — optionally with heating — is worked up by customary methods.

The compounds according to the invention are in most cases obtained in the form of colorless to slightly yellow-colored, viscous, water-insoluble oils which cannot be distilled without decomposition but can, by so-called "slight distillation," that is by prolonged heating at moderately elevated temperatures under reduced pressure, be freed from the last volatile components and in this way be purified. For their characterization, the refractive indexes are especially suitable.

As already mentioned, the new 0-(N-alkoxybenzimidoyl)-(thiono)phosphoric(phosphonic) acid esters are distinguished by an outstanding insecticidal and acaricidal effectiveness against crop pests, pests harmful to health and pests of stored products. They possess a good activity against both sucking and eating insects, and mites (Acarina), but at the same time they exhibit only a very low phytotoxicity. In some cases they are also of interest in the ectoparasite field. For these reasons, the compounds according to the invention may be used with success as pesticides in crop protection and the protection of stored goods, as well as in the hygiene and veterinary fields.

In the course of time, parasitizing Diptera larvae have in various areas become resistant to the agents based on organic phosphorus compounds and carbamates used hitherto as prophylactics, so that the success of treatment is to an increasing extent rendered questionable, In order to ensure an economic livestock husbandry in the infestation areas, there exists therefore an urgent need for agents with which the infestation with blowfly larvae, even of resistant strains, for example of the genus Licilia, can be prevented with certainty. For example, in Australia the Goondiwindi strain and in South Africa the Alexandria strain of *Lucilia cuprina* have become to a great extent resistant to the phosphoric acid esters and carbamates used hitherto. The active compounds according to the present invention prove to be equally well effective both against the normally sensitive and against the resistant blowfly strains in that they show an equally long prophylactic protective duration both against normally sensitive and against resistant blowfly larvae.

To the sucking insects against which the novel compounds may be used, there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (Aspidiotus hederae) and the soft scale (*Lecanium hesperidum*) as well as the grape mealybug (*Pseudococcus maritimus*); thrips (Thysanoptera), such as Hercinothrips femoralis, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects contemplated herein are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weeveil (*Bruchidius = Acanthoscelides obtectus*), the leather beetle (*Dermestes frischi*), the khapra beetle (*Trogoderma granarium*), the flour beetle (*Tribolium castaneum*), the norther corn billbug (*Calandra or Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*) the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the compounds of this invention are also distinguished by an outstanding residual activity on wood and clay, as well as a good stability to alkali on limed substrates.

In the veterinary field, the compounds according to the invention may be used with success against numerous noxious animal parasites (ectoparasites such as arachnids and insects). As ectoparasites contemplated herein, there are mentioned here from the class of the Arachnidea: Ixodidae, such as for example the one-host Australian and South American cattle tick *Boophilus microplus*, the one-host American cattle tick *Boophilus annulatus* and the one host African cattle tick *Boophilus decoloratus* (in each case, strains normally sensitive to, and strains resistant to, phosphoric acid esters and carbamates), as well as multi-host cattle and sheep ticks of the genera Rhipicephalus (for example *Rhipicephalus evertsi*, *Rhipicephalus appendiculatus*, *Rhipicephalus simus*, *Rhipicephalus bursa*), Amblyomma (for example *Amblyomma hebraeaum*), Hyalomma (for example *Hyalomma truncatum*) and Ixodes (for example *Ixodes rubicundus*); and the like.

As ectoparasites contemplated herein from the class of the insects, there are mentioned: mallophagans, for example the sheep biting louse (*Damalinia ovis*) and the chicken body louse (*Eomenacanthus stramineus*); Anoplura for example the short-nosed cattle louse (*Haematopinus eurysternus*); Diptera for example the sheep ked (*Melophagus ovinus*) permanently parasitizing on the host) and certain flies (temporarily parasitizing on the host), for example *Liperosia irritans*, *Liperosia exigua* and *Musca autumnalis;* Diptera larvae (parasitizing in warm-blooded animals) such as blowfly larvae (for example larvae of *Lucilia sericata*, of *Lucilia cuprina* (strains normally sensitive to, and strains resistant to, phosphoric acid esters) and of *Chrysomyia chloropyga*); further larvae of warble flies, for example *Hypoderma bovis*, as well as screwworm larvae, for example of the genus *Cochliomyia macellaria*; and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: Aerosol propellants which are gaseous at normal temperatures and pressures, such as freon; inert dispersible liquid diluent carriers, including inert organic solvents, such as aromatic hydrocarbon (e.g. benzene, toluene, xylene, etc.), halogenated, especially chlorinated, aromatic hydro-carbons (e.g. chlorobenzenes, etc.), paraffins (e.g. petroleum and mineral oil fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides or fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects and acarids, and which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dipping of animals, administering perenterally or by injection and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE

Drosophila Test
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 cc of the preparation of the active compound is applied with a pipette to a filter paper disc of 7 cm diameter. The wet disc is placed in a glass vessel containing 50 vinegar flies (*Drosophila melanogaster*) and covered with a glass plate.

After the specified periods of time, the destruction is determined as a percentage: 100 percent means that all the flies are killed; 0 percent means that none of the flies are killed.

The active compounds, their concentrations, the evaluation times and the degree of destruction can be seen from Table 1:

TABLE 1

(Drosophila test)

| Active compound | Concentration of active compound in % | Degree of destruction in % after 1 day |
|---|---|---|
| (A) C$_6$H$_5$—C(S)—S—P(OC$_2$H$_5$)$_2$, N—CH$_3$ (known) | 0.1<br>0.01 | 90<br>0 |
| (5) C$_6$H$_5$—C(S)—O—P(OC$_2$H$_5$)$_2$, N—OCH$_3$ | 0.1<br>0.01<br>0.001<br>0.0001 | 100<br>100<br>100<br>98 |
| (6) C$_6$H$_5$—C(S)—O—P(C$_2$H$_5$)(OC$_2$H$_5$), N—OCH$_3$ | 0.1<br>0.01<br>0.001<br>0.0001 | 100<br>100<br>100<br>100 |
| (2) C$_6$H$_5$—C(S)—O—P(OCH$_3$)$_2$, N—OC$_2$H$_5$ | 0.1<br>0.01<br>0.001<br>0.0001 | 100<br>100<br>100<br>99 |
| (1) C$_6$H$_5$—C(S)—O—P(OC$_2$H$_5$)$_2$, N—OC$_2$H$_5$ | 0.1<br>0.01<br>0.001<br>0.0001 | 100<br>100<br>100<br>60 |
| (4) C$_6$H$_5$—C(S)—O—P(C$_2$H$_5$)(OC$_2$H$_5$), N—OC$_2$H$_5$ | 0.1<br>0.01<br>0.001<br>0.0001 | 100<br>100<br>100<br>99 |
| (3) C$_6$H$_5$—C(O)—O—P(OC$_2$H$_5$)$_2$, N—OC$_2$H$_5$ | 0.1<br>0.01<br>0.001 | 100<br>100<br>95 |

| | | | |
|---|---|---|---|
| (8) | Cl-C₆H₃-C(=S)(N-OC₂H₅)-O-P(=S)(OC₂H₅)₂ | 0.1 / 0.01 / 0.001 | 100 / 100 / 90 |
| (13) | 2-Cl-C₆H₄-C(=N-OC₂H₅)-O-P(=S)(OC₂H₅)(C₂H₅) | 0.1 / 0.01 / 0.001 | 100 / 100 / 100 |
| (9) | Cl-C₆H₄-C(=N-OC₂H₅)-O-P(=S)(OC₂H₅)₂ | 0.1 / 0.01 / 0.001 | 100 / 100 / 80 |
| (7) | Cl-C₆H₄-C(=N-OC₂H₅)-O-P(=S)(OC₂H₅)₂ | 0.1 / 0.01 / 0.001 | 100 / 100 / 80 |
| (10) | Br-C₆H₄-C(=N-OC₂H₅)-O-P(=S)(OC₂H₅)₂ | 0.1 / 0.01 / 0.001 | 100 / 100 / 75 |
| (11) | H₃C-C₆H₄-C(=N-OC₂H₅)-O-P(=S)(OC₂H₅)₂ | 0.1 / 0.01 / 0.001 | 100 / 100 / 85 |
| (12) | O₂N-C₆H₄-C(=N-OC₂H₅)-O-P(=S)(OC₂H₅)₂ | 0.1 / 0.01 / 0.001 | 100 / 100 / 99 |
| (27) | Cl-C₆H₄-C(=N-OC₂H₅)-O-P(=S)(OCH₃)₂ | 0.1 / 0.01 / 0.001 / 0.0001 | 100 / 100 / 100 / 100 |
| (28) | Cl-C₆H₄-C(=N-OC₂H₅)-O-P(=S)(OCH₃)₂ | 0.1 / 0.01 / 0.001 | 100 / 100 / 100 |
| (29) | Br-C₆H₄-C(=N-OC₂H₅)-O-P(=S)(OCH₃)₂ | 0.1 / 0.01 / 0.001 | 100 / 100 / 100 |
| (30) | O₂N-C₆H₄-C(=N-OC₂H₅)-O-P(=S)(OCH₃)₂ | 0.1 / 0.01 / 0.001 | 100 / 100 / 100 |
| (15) | C₆H₅-C(=N-OCH₃)-O-P(=S)(OCH₃)₂ | 0,1 / 0,01 / 0,001 / 0,0001 | 100 / 100 / 100 / 100 |
| (22) | Cl-C₆H₄-C(=N-OCH₃)-O-P(=S)(OCH₃)₂ | 0,1 / 0,01 / 0,001 / 0,0001 | 100 / 100 / 100 / 100 |
| (23) | Cl-C₆H₄-C(=N-OCH₃)-O-P(=S)(OCH₃)₂ | 0,1 / 0,01 / 0,001 / 0,0001 / 0,00001 | 100 / 100 / 100 / 100 / 100 |
| (24) | Cl-C₆H₄-C(=N-OCH₃)-O-P(=S)(OCH₃)₂ | 0,1 / 0,01 / 0,001 / 0,0001 | 100 / 100 / 100 / 100 |
| (25) | Br-C₆H₄-C(=N-OCH₃)-O-P(=S)(OCH₃)₂ | 0,1 / 0,01 / 0,001 / 0,0001 | 100 / 100 / 100 / 100 |
| (16) | CH₃-C₆H₄-C(=N-OCH₃)-O-P(=S)(OCH₃)₂ | 0,1 / 0,01 / 0,001 / 0,0001 | 100 / 100 / 100 / 100 |
| (18) | CH₃-C₆H₄-C(=N-OC₂H₅)-O-P(=S)(OCH₃)₂ | 0,1 / 0,01 / 0,001 / 0,0001 | 100 / 100 / 100 / 100 |
| (17) | CH₃-C₆H₄-C(=N-OCH₃)-O-P(=S)(OC₂H₅)₂ | 0,1 / 0,01 / 0,001 / 0,0001 | 100 / 100 / 100 / 90 |
| (19) | CH₃-C₆H₄-C(=N-OC₂H₅)-O-P(=S)(OC₂H₅)₂ | 0,1 / 0,01 / 0,001 / 0,0001 | 100 / 100 / 100 / 95 |
| (26) | O₂N-C₆H₄-C(=N-OCH₃)-O-P(=S)(OCH₃)₂ | 0,1 / 0,01 / 0,001 | 100 / 100 / 100 |

EXAMPLE 2

Phaedon Larvae Test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed. 0 percent means that none of the beetle larvae are killed.

The active compounds, the concentration of the active compound, the times of evaluation and the results can be seen from the following Table 2:

TABLE 2

(Phaedon larvae test)

| Active compound | Concentration of active compound in % | Degree of destruction in % after 3 days |
|---|---|---|
| (A) 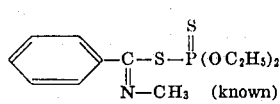 (known) | 0.1 | 0 |

| | | | |
|---|---|---|---|
| (5) | 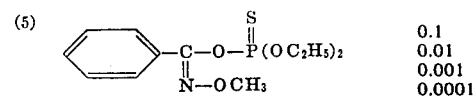 | 0.1 0.01 0.001 0.0001 | 100 100 65 45 |
| (6) | 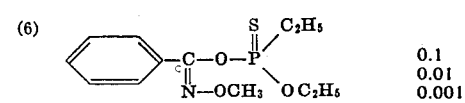 | 0.1 0.01 0.001 | 100 100 60 |
| (2) | 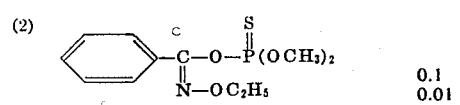 | 0.1 0.01 | 100 100 |
| (1) | 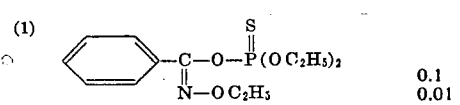 | 0.1 0.01 | 100 100 |
| (4) | 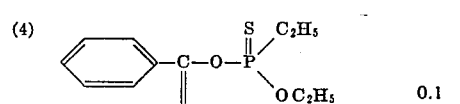 | 0.1 0.01 | 100 100 |
| (8) | 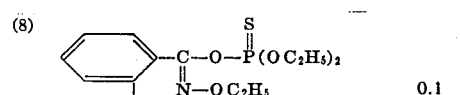 | 0.1 0.01 | 100 100 |
| (13) | 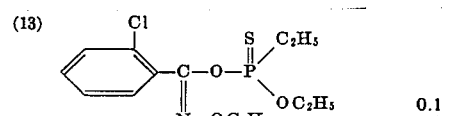 | 0.1 0.01 | 100 100 |
| (9) | 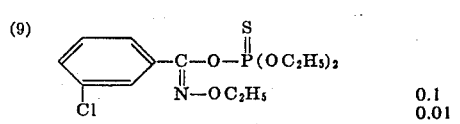 | 0.1 0.01 | 100 100 |
| (7) | 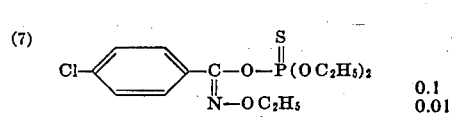 | 0.1 0.01 | 100 100 |
| (10) | 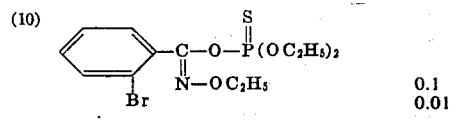 | 0.1 0.01 | 100 100 |
| (12) | 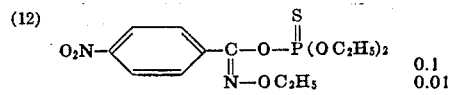 | 0.1 0.01 | 100 100 |
| (14) | 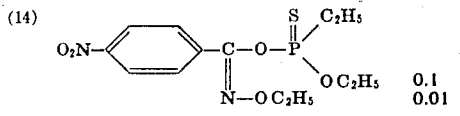 | 0.1 0.01 | 100 100 |
| (27) | 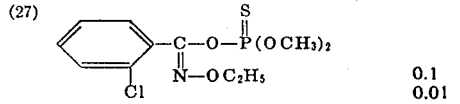 | 0.1 0.01 | 100 100 |
| (28) | 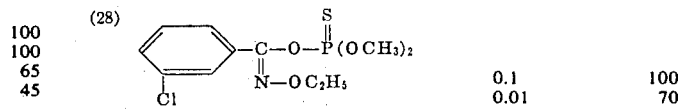 | 0.1 0.01 | 100 70 |
| (29) | 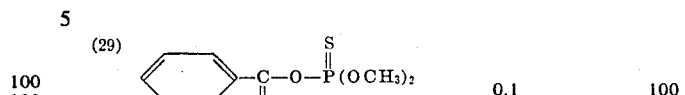 | 0.1 0.01 0.001 | 100 100 100 |
| (30) | 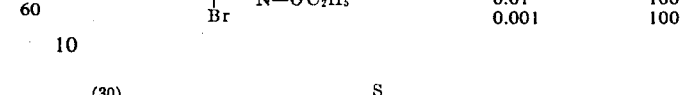 | 0.1 0.01 0.001 | 100 100 60 |

EXAMPLE 3

Myzus Test (Contact Action)

Solvent: 3 parts by weight acetone

Emulsifier: 1 part by weight alkylarylpolyglycol ether

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 3:

TABLE 3

(Myzus test)

| Active compound | | Concentration of active compound in % | Degree of destruction in % after 1 day |
|---|---|---|---|
| (A) | 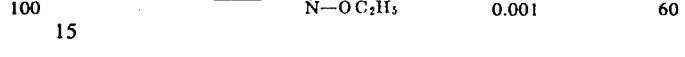 | 0.1 0.01 | 60 0 |
| (5) | | 0.1 0.01 | 100 90 |
| (6) | | 0.1 0.01 0.001 | 100 100 90 |
| (4) | | 0.1 0.01 | 100 90 |

| No. | Structure | Conc. | Result |
|---|---|---|---|
| (3) | C₆H₅–C(=N–OC₂H₅)–O–P(=O)(OC₂H₅)₂ | 0.1 / 0.01 | 100 / 50 |
| (8) | 2-Cl-C₆H₄–C(=N–OC₂H₅)–O–P(=S)(OC₂H₅)₂ | 0.1 / 0.01 | 100 / 100 |
| (13) | 2-Cl-C₆H₄–C(=N–OC₂H₅)–O–P(=S)(C₂H₅)(OC₂H₅) | 0.1 / 0.01 | 100 / 99 |
| (10) | 2-Br-C₆H₄–C(=N–OC₂H₅)–O–P(=S)(OC₂H₅)₂ | 0.1 / 0.01 | 100 / 95 |
| (12) | 4-O₂N-C₆H₄–C(=N–OC₂H₅)–O–P(=S)(OC₂H₅)₂ | 0.1 / 0.01 / 0.001 / 0.0001 | 100 / 100 / 100 / 70 |
| (14) | 4-O₂N-C₆H₄–C(=N–OC₂H₅)–O–P(=S)(C₂H₅)(OC₂H₅) | 0.1 / 0.01 / 0.001 / 0.0001 | 100 / 100 / 100 / 90 |
| (30) | 4-O₂N-C₆H₄–C(=N–OC₂H₅)–O–P(=S)(OCH₃)₂ | 0.1 / 0.01 / 0.001 / 0.0001 | 100 / 100 / 100 / 40 |
| (26) | 4-O₂N-C₆H₄–C(=N–OCH₃)–O–P(=S)(OCH₃)₂ | 0,1 / 0,01 / 0,001 / 0,0001 | 100 / 100 / 100 / 45 |

EXAMPLE 4

Tetranychus Test

Solvent: 3 parts by weight acetone

Emulsifier: 1 part by weight alkylarylpolyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from the following Table 4:

TABLE 4

(Tetranychus test)

| Active compound | Concentration of active compound in % | Degree of destruction in % after 2 days |
|---|---|---|
| (A) C₆H₅–C(=N–CH₃)–S–P(=S)(OC₂H₅)₂ (known) | 0.1 | 0 |
| (8) 2-Cl-C₆H₄–C(=N–OC₂H₅)–O–P(=S)(OC₂H₅)₂ | 0.1 | 99 |
| (14) 4-O₂N-C₆H₄–C(=N–OC₂H₅)–O–P(=S)(C₂H₅)(OC₂H₅) | 0.1 | 90 |
| (22) 2-Cl-C₆H₄–C(=N–OCH₃)–O–P(=S)(OCH₃)₂ | 0.1 / 0.01 | 100 / 90 |
| (25) 2-Br-C₆H₄–C(=N–OCH₃)–O–P(=S)(OCH₃)₂ | 0.1 / 0.01 | 100 / 100 |
| (26) 4-O₂N-C₆H₄–C(=N–OCH₃)–O–P(=S)(OCH₃)₂ | 0.1 | 100 |

EXAMPLE 5

$LD_{100}$ Test

Test animals: *Sitophilus granarius*

Solvent: acetone 2 parts by weight of the active compound are dissolved in 1000 parts by volume of the solvent. The solution so obtained is diluted with further solvent to the desired concentrations.

2.5 ml of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 25 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 5:

TABLE 5
(LD₁₀₀ test)

| Active compound | | Concentration of active compound of the solution in % | Degree of destruction in % |
|---|---|---|---|
| (A) | Ph-C(=N-CH₃)-S-P(S)(OC₂H₅)₂ (known) | 0.2 | 0 |
| (4) | Ph-C(=N-OC₂H₅)-O-P(S)(C₂H₅)(OC₂H₅) | 0.2 / 0.02 | 100 / 60 |
| (13) | (Cl)Ph-C(=N-OC₂H₅)-O-P(S)(C₂H₅)(OC₂H₅) | 0.2 / 0.02 / 0.002 | 100 / 100 / 100 |
| (8) | (Cl)Ph-C(=N-OC₂H₅)-O-P(S)(OC₂H₅)₂ | 0.2 / 0.02 | 100 / 100 |
| (10) | (Br)Ph-C(=N-OC₂H₅)-O-P(S)(OC₂H₅)₂ | 0.2 / 0.02 | 100 / 100 |
| (12) | O₂N-Ph-C(=N-OC₂H₅)-O-P(S)(OC₂H₅)₂ | 0.2 / 0.02 | 100 / 100 |
| (14) | O₂N-Ph-C(=N-OC₂H₅)-O-P(S)(C₂H₅)(OC₂H₅) | 0.2 / 0.02 | 100 / 100 |
| (27) | (Cl)Ph-C(=N-OC₂H₅)-O-P(S)(OCH₃)₂ | 0.2 / 0.02 / 0.002 | 100 / 100 / 50 |
| (30) | O₂N-Ph-C(=N-OC₂H₅)-O-P(S)(OCH₃)₂ | 0.2 / 0.02 | 100 / 50 |
| (29) | (Br)Ph-C(=N-OC₂H₅)-O-P(S)(OCH₃)₂ | 0.2 / 0.02 / 0.002 | 100 / 100 / 50 |

EXAMPLE 6

Mosquito Larvae Test

Test insects: *Aedes aegypti* larvae
Solvent: 99 parts by weight acetone
Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100 percent means that all the larvae are killed. 0 percent means that no larvae at all are killed.

The active compounds, the concentrations of the active compounds, the test insects and the results can be seen from Table 6:

TABLE 6
(Mosquito larvae test)

| Active compound | | Concentration of active compound of the solution in ppm | Degree of destruction in % |
|---|---|---|---|
| (A) | Ph-C(=N-CH₃)-S-P(S)(OC₂H₅)₂ (known) | 10 | 0 |
| (5) | Ph-C(=N-OCH₃)-O-P(S)(OC₂H₅)₂ | 10 / 1 / 0.1 | 100 / 100 / 40 |
| (6) | Ph-C(=N-OCH₃)-O-P(S)(C₂H₅)(OC₂H₅) | 10 / 1 | 100 / 100 |
| (2) | Ph-C(=N-OC₂H₅)-O-P(S)(OCH₃)₂ | 10 / 1 | 100 / 70 |
| (1) | Ph-C(=N-OC₂H₅)-O-P(S)(OC₂H₅)₂ | 10 / 1 | 100 / 80 |
| (4) | Ph-C(=N-OC₂H₅)-O-P(S)(C₂H₅)(OC₂H₅) | 10 / 1 | 100 / 100 |
| (13) | (Cl)Ph-C(=N-OC₂H₅)-O-P(S)(C₂H₅)(OC₂H₅) | 10 / 1 / 0.1 | 100 / 100 / 30 |
| (8) | (Cl)Ph-C(=N-OC₂H₅)-O-P(S)(OC₂H₅)₂ | 10 / 1 / 0.1 | 100 / 100 / 100 |

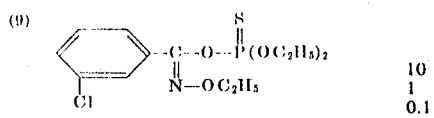
(9) | 10 | 100
| 1 | 100
| 0.1 | 90

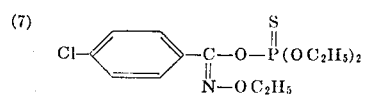
(7) | 10 | 100
| 1 | 90

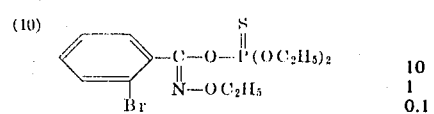
(10) | 10 | 100
| 1 | 100
| 0.1 | 100

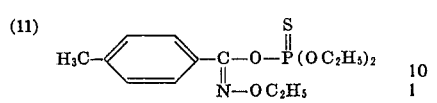
(11) | 10 | 100
| 1 | 100

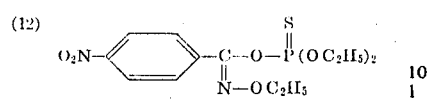
(12) | 10 | 100
| 1 | 100

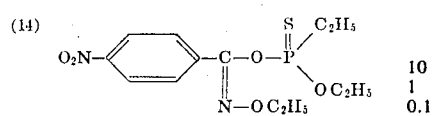
(14) | 10 | 100
| 1 | 100
| 0.1 | 80

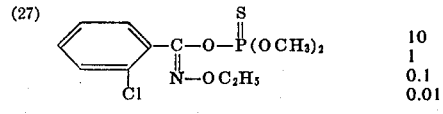
(27) | 10 | 100
| 1 | 100
| 0.1 | 100
| 0.01 | 30

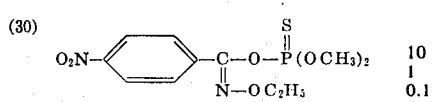
(30) | 10 | 100
| 1 | 100
| 0.1 | 90

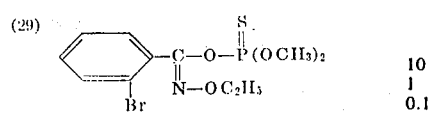
(29) | 10 | 100
| 1 | 100
| 0.1 | 100

EXAMPLE 7

LT$_{100}$ Test for Diptera
Test animals: *Musca domestica*
Solvent: acetone 2 parts by weight of active compound are dissolved in 1000 parts by volume of solvent. The solution so obtained is diluted with further solvent to the desired lower concentrations.

2.5 ml of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test animals are then placed in the Petri dish and it is covered with a glass lid.

The condition of the test animals is periodically observed. The time which is necessary for a 100 percent destruction is determined.

The test animals, the active compounds, the concentrations of the active compounds and the periods of time at which there is a 100 percent destruction can be seen from the following Table 7:

TABLE 7

(LT$_{100}$ test for Diptera)

| Active compound | Concentration of active compound of the solution in % | Lt$_{100}$ |
|---|---|---|
| (A) phenyl-C(=N-CH$_3$)-S-P(=S)(OC$_2$H$_5$)$_2$ (known) | 0.2 | 8$^h$ = 0% |
| (5) phenyl-C(=N-OCH$_3$)-O-P(=S)(OC$_2$H$_5$)$_2$ | 0.2 | 55' |
|  | 0.02 | 130' |
|  | 0.002 | 8$^h$ = 40% |
| (6) phenyl-C(=N-OCH$_3$)-O-P(=S)(C$_2$H$_5$)(OC$_2$H$_5$) | 0.2 | 50' |
|  | 0.02 | 55' |
| (2) phenyl-C(=N-OC$_2$H$_5$)-O-P(=S)(OCH$_3$)$_2$ | 0.2 | 60' |
|  | 0.02 | 110' |
|  | 0.002 | 6$^h$ |
| (1) phenyl-C(=N-OC$_2$H$_5$)-O-P(=S)(OC$_2$H$_5$)$_2$ | 0.2 | 75' |
|  | 0.02 | 180' |
|  | 0.002 | 8$^h$ = 60% |
| (4) phenyl-C(=N-OC$_2$H$_5$)-O-P(=S)(C$_2$H$_5$)(OC$_2$H$_5$) | 0.2 | 60' |
|  | 0.02 | 150' |
|  | 0.002 | 6$^h$ |
| (3) phenyl-C(=N-OC$_2$H$_5$)-O-P(=O)(OC$_2$H$_5$)$_2$ | 0.2 | 45' |
|  | 0.02 | 180' |
|  | 0.002 | 8$^h$ = 70% |
| (13) Cl-phenyl-C(=N-OC$_2$H$_5$)-O-P(=S)(C$_2$H$_5$)(OC$_2$H$_5$) | 0.2 | 75' |
|  | 0.02 | 180' |
| (8) phenyl(Cl)-C(=N-OC$_2$H$_5$)-O-P(=S)(OC$_2$H$_5$)$_2$ | 0.2 | 60' |
|  | 0.02 | 100' |
|  | 0.002 | 6$^h$ |
| (9) phenyl(Cl)-C(=N-OC$_2$H$_5$)-O-P(=S)(OC$_2$H$_5$)$_2$ | 0.2 | 120' |
|  | 0.02 | 240' |
| (7) Cl-phenyl-C(=N-OC$_2$H$_5$)-O-P(=S)(OC$_2$H$_5$)$_2$ | 0.2 | 95' |
|  | 0.02 | 6$^h$ |

| | | | |
|---|---|---|---|
| (10) | [structure: phenyl with Br, -C(=S)-O-P(OC2H5)2, N-OC2H5] | 0.2 / 0.02 / 0.002 | 75' / 200' / 8ʰ = 90% |
| (11) | [structure: H3C-phenyl-C(=S)-O-P(OC2H5)2, N-OC2H5] | 0.2 / 0.02 | 120' / 240' |
| (12) | [structure: O2N-phenyl-C(=S)-O-P(OC2H5)2, N-OC2H5] | 0.2 | 95' |
| (27) | [structure: phenyl with Cl, -C(=S)-O-P(OCH3)2, N-OC2H5] | 0.2 / 0.02 / 0.002 | 30' / 60' / 180' |
| (30) | [structure: O2N-phenyl-C(=S)-O-P(OCH3)2, N-OC2H5] | 0.2 | 8ʰ |
| (29) | [structure: phenyl with Br, -C(=S)-O-P(OCH3)2, N-OC2H5] | 0.2 / 0.02 / 0.002 | 30' / 90' / 6ʰ |

EXAMPLE 8

Phorodon Test (Contact Action)
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*) are sprayed with the preparation of the active compound until dripping wet.

After the specified periods of time, the degree of destruction is determined as a percentage: 100 percent means that all the aphids were killed; 0 percent means that none of the aphids were killed.

The active compounds, the concentrations of the active compounds, the evaluation times and the results can be seen from the following Table 8:

TABLE 8

(Phorodon humuli)

| Active compound | | Concentration of active compound in % | Degree of destruction in % after 1 day |
|---|---|---|---|
| (A) | [structure: phenyl-C(=S)-S-P(OC2H5)2, N-CH3] (known) | 0.02 | 30 |

| | | | |
|---|---|---|---|
| (4) | [structure: phenyl-C(=S)-O-P(C2H5)(OC2H5), N-OC2H5] | 0.02 / 0.004 / 0.0008 | 100 / 100 / 98 |
| (14) | [structure: O2N-phenyl-C(=S)-O-P(C2H5)(OC2H5), N-OC2H5] | 0.02 / 0.004 / 0.0008 / 0.00016 | 100 / 100 / 100 / 100 |

EXAMPLE 9

Myzus Test (Contact Action) (Resistant)
Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 9:

TABLE 9

(*Myzus persicae* test / resistant)

| Active compound | | Concentration of active compound in % | Degree of destruction in % after 1 day |
|---|---|---|---|
| (A) | [structure: phenyl-C(=S)-S-P(OC2H5)2, N-CH3] (known) | 0.1 / 0.02 | 35 / 20 |
| (13) | [structure: Cl-phenyl-C(=S)-O-P(C2H5)(OC2H5), N-OC2H5] | 0.1 / 0.02 / 0.004 | 100 / 97 / 50 |
| (14) | [structure: O2N-phenyl-C(=S)-O-P(C2H5)(OC2H5), N-OC2H5] | 0.1 / 0.02 / 0.004 / 0.0008 | 100 / 99 / 93 / 45 |

EXAMPLE 10

Test with Parasitizing Fly Larvae
Solvent: 35 parts by weight ethyleneglycol-monomethyl ether.
Emulsifier: 35 parts by weight nonylphenolpolyglycol ether.

To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (*Lucilia cuprina*) are put into a test-tube which contains about 1 cc of horse musculature. 0.5 ml of the preparation of active compound are applied to this horseflesh. After 24 hours, the degree of destruction is determined as a percentage. 100 percentage means that all, 0 percent that no, larvae have been killed.

The active compound tested, the concentration applied and the test results obtained can be seen from Table 10.

EXAMPLE

Tick Test
Solvent: 35 parts by weight ethyleneglycol-monomethyl ether
Emulsifier: 35 parts by weight nonylphenolpolyglycol ether To produce a suitable formulation, 3 parts by weight of the active compound are mixed with 7 parts by weight of the above-mentioned solvent-emulsifier mixture, and the emulsion concentrate so obtained is diluted with water to the concentration desired in each case.

Adult, gorged female ticks of the species *Boophilus microplus* (sensitive and resistant, respectively) are immersed for one minute in these preparations of active compound. After immersion of, in each case, 10 female specimens of the various tick species, they are transferred to Petri dishes, the bottom of which is covered with a correspondingly large filter disc.

After 10 days, the effectiveness of the preparation of active compound is determined by ascertaining the inhibition of egg deposition compared with untreated control ticks. The effect is expressed as a percentage, 100 percent meaning that eggs ceased to be deposited, and 0 percent signifying that the ticks deposited eggs in normal amount.

The active compounds investigated, the concentrations tried, the parasites tested and the findings obtained can be seen from the following Table 10.

TABLE 10

| Active compound | Concentration of active compound in, p.p.m. | Degree of destruction in percent (*Lucilia cuprina*) | Concentration of active compound in, p.p.m. | Inhibition of egg deposition in percent (*Boophilus microplus*) | |
|---|---|---|---|---|---|
| | | | | Ridgeland strain | Biarra strain |
| (1) C₆H₅–C(=N–OC₂H₅)–O–P(=S)(OC₂H₅)₂ | 300<br>100<br>30<br>10 | 100<br>100<br>100<br>100 | | | |
| (2) C₆H₅–C(=N–OC₂H₅)–O–P(=S)(OCH₃)₂ | 300<br>100<br>30<br>10 | 100<br>100<br>100<br>100 | | | |
| (3) C₆H₅–C(=N–OC₂H₅)–O–P(=O)(OC₂H₅)₂ | 300<br>100<br>30<br>10<br>3 | 100<br>100<br>>50<br>>50<br><50 | | | |
| (4) C₆H₅–C(=N–OC₂H₅)–O–P(=S)(C₂H₅)(OC₂H₅) | 300<br>30<br>3 | 100<br>100<br><50 | | | |
| (5) C₆H₅–C(=N–OCH₃)–O–P(=S)(OC₂H₅)₂ | 300<br>100<br>30<br>10<br>3<br>1 | 100<br>100<br>100<br>>50<br>>50<br>>50 | | | |
| (6) C₆H₅–C(=N–OCH₃)–O–P(=S)(C₂H₅)(OC₂H₅) | 300<br>100<br>30<br>10<br>3 | 100<br>100<br>100<br>100<br>100 | | | |
| (7) Cl–C₆H₄–C(=N–OC₂H₅)–O–P(=S)(OC₂H₅)₂ | 300<br>100<br>30<br>10 | 100<br>100<br>100<br>100 | 10,000<br>3,000<br>1,000 | >50<br>>50 | |
| (8) C₆H₄(Cl)–C(=N–OC₂H₅)–O–P(=S)(OC₂H₅)₂ | 300<br>100<br>30 | 100<br>100<br>100 | 10,000<br>3,000<br>1,000<br>300<br>100<br>30 | 100<br>100<br>100<br>100<br>>50<br><50 | 100<br>100<br>>50<br>>50 |
| (9) Cl–C₆H₄–C(=N–OC₂H₅)–O–P(=S)(OC₂H₅)₂ | 300<br>100<br>30<br>10 | 100<br>100<br>100<br>100 | 10,000<br>3,000 | >50<br>>50 | 100<br>100 |
| (10) Br–C₆H₄–C(=N–OC₂H₅)–O–P(=S)(OC₂H₅)₂ | 300<br>100<br>30<br>10 | 100<br>100<br>100<br>100 | 10,000<br>3,000<br>1,000<br>300<br>100 | 100<br>100<br>100<br>>50<br>>50 | 100<br>>50<br>>50<br>>50<br><50 |

TABLE 10—Continued

| Active compound | Concentration of active compound in, p.p.m. | Degree of destruction in percent (Lucilia cuprina) | Concentration of active compound in, p.p.m. | Inhibition of egg deposition in percent (Boophilus microplus) | |
|---|---|---|---|---|---|
| | | | | Ridgeland strain | Biarra strain |
| (11) H$_3$C—⟨phenyl⟩—C(=N—OC$_2$H$_5$)—O—P(=S)(OC$_2$H$_5$)$_2$ | 300<br>100<br>30 | 100<br>100<br>100 | 10,000 | >50 | |
| (12) O$_2$N—⟨phenyl⟩—C(=N—OC$_2$H$_5$)—O—P(=S)(OC$_2$H$_5$)$_2$ | 300<br>100<br>30<br>10<br>3 | 100<br>100<br>100<br>100<br>100 | | | |

EXAMPLE 12

Blowfly Larvae Test on Artificially Infected Sheep

Solvent: 35 parts by weight ethyleneglycolmonomethyl ether

Emulsifier: 35 parts by weight nonylphenolpolyglycol ether

To produce a suitable formulation, 3 parts by weight of active compound are mixed with 7 parts of the abovementioned solvent-emulsifier mixture, and the emulsion concentrate so obtained is diluted with water to the concentration desired in each case.

Groups of sheep with a certain length of wool are dipped in these preparation of active compound. At intervals of 14 days, beginning 14 days after application of the active compound, normally sensitive blowfly larvae and resistant blowfly larvae are implanted at, in each case, 2 body sites behind the shoulder blade and at the level of the points of the hip bones. In addition, blowfly larvae are inserted into incised wounds about 2 cm long (contaminated with a mixture of sheep dung and scraped meat) in the skin of sheep. The sheep are kept at grass during the summer months and in a sheep-shed (20°C ± 3°C; 70 percent relative humidity ± 10 percent during the winter months.

Observation of the active compound takes place in each case 48 hours after implantation of the larvae. As the criterion for the in-vivo effect, the length of duration of protection after dipping is taken. The duration of protection is the length of time in which a commencement of infection with the implanted larvae is completely prevented.

The active compounds investigated, the concentrations tried, the parasites tested and the findings obtained can be seen from the following Table 11:

TABLE 11
[Blowfly larvae test on artificially infected sheep]

| Active compound | Concentration of active compound in p.p.m. before infection | Type of larvae | Average duration of protection in weeks |
|---|---|---|---|
| (1) ⟨phenyl⟩—C(=N—OC$_2$H$_5$)—O—P(=S)(OC$_2$H$_5$)$_2$ | 1,000<br>1,000<br>750<br>750<br>500<br>500 | Sensitive<br>Resistant<br>Sensitive<br>Resistant<br>Sensitive<br>Resistant | 14<br>14<br>14<br>14<br>14<br>14 |
| (B) CH$_3$S—⟨phenyl with CH$_3$⟩—O—P(=S)(OC$_2$H$_5$)$_2$ | 500<br>500 | Sensitive<br>Resistant | 10 (4-14)<br>5.6 (2-12) |
| (known) Control | | Sensitive | 0 |
| (Untreated) | | Resistant | 0 |

EXAMPLE 13

Stinging Fly Test

Solvent: 35 parts by weight ethyleneglycolmonomethyl ether

Emulsifier: 35 parts by weight nonylphenolpolyglycol ether

To produce a suitable formulation, 3 parts by weight of active compound are mixed with 7 parts of the above-mentioned solvent-emulsifier mixture, and the emulsion concentrate so obtained is diluted with water to the concentration desired in each case.

1.5 ml of the formulation for application are pipetted on to a round filter paper with a diameter of 7.5 cm. After air-drying of this impregnated filter paper, this is transferred to a Petri dish. 25 stinging flies (*Stomoxys calcitrans*) are then put into the Petri dish and covered with a lid.

At various times after the treatment, the degree of destruction is determined; 100 percent means that all the flies, and 0 percent denotes that none of the flies, have been killed.

The active compound investigated, the concentrations tried, the parasite tested and the findings obtained can be seen from the following Table 12:

TABLE 12

[Stinging fly test]

| Active compound | Parasite | Concentration of active compound in p.p.m. | Effect in percent (hours after insertion of the flies) after— | |
|---|---|---|---|---|
| | | | 1 hr. | 24 hrs. |
| (1) $\langle\!\!\bigcirc\!\!\rangle$—C(=S)—O—P(OC$_2$H$_5$)$_2$ ‖ N—OC$_2$H$_5$ | Stomoxys calcitrans | 1,000<br>100<br>10<br>1 | 100<br>>50<br><50<br>0 | 100<br>100<br>100<br>0 |

EXAMPLE 14

Blowfly Test

Solvent: 35 parts by weight ethyleneglycolmonomethyl ether

Emulsifier: 35 parts by weight nonylphenolpolyglycol ether

To produce a suitable formulation, 3 parts by weight of active compound are mixed with 7 parts of the abovementioned solvent-emulsifier mixture, and the emulsion concentrate so obtained is diluted with water to the concentration desired in each case.

1.5 ml of the formulation for application are pipetted on to a round filter paper with a diameter of 7.5 cm. After air-drying of this impregnated filter paper, this is transferred to a Petri dish. 25 blowflies (*Lucilia cuprina*, strains normally sensitive to, and strains resistant to, phosphoric acid esters) are then put into the Petri dish and covered with a lid.

At various times after the treatment, the degree of destruction is determined; 100 percent means that all the flies, and 0 percent denotes that none of the flies, have been killed.

The active compound investigated, the concentrations tried, the parasites tested and the findings obtained can be seen from the following Table 13:

TABLE 13

(Blowfly test)

| Active compound | Type of fly | Concentration of active compound in p.p.m. | Effect in % | |
|---|---|---|---|---|
| | | | 1 hr. | after 24 hr. |
| | Lucilia cuprina (sensitive) | 1000<br>100<br>10<br>1 | 100<br><50<br>0<br>0 | 100<br>100<br>100<br><50 |
| (1) $\langle\!\!\bigcirc\!\!\rangle$—C(=S)—O—P(OC$_2$H$_5$)$_2$ ‖ N—OC$_2$H$_5$ | | | | |
| | Lucilia cuprina (resistant) | 1000<br>100<br>10<br>1 | 100<br><50<br>0<br>0 | 100<br>100<br>100<br><50 |

EXAMPLE 15

Sheep Ked Test

Solvent: 35 parts by weight ethyleneglycolmonomethyl ether

Emulsifier: 35 parts by weight nonylphenolpolyglycol ether

To produce a suitable formulation, 3 parts by weight of active compound are mixed with 7 parts of the abovementioned solvent-emulsifier mixture, and the emulsion concentrate so obtained is diluted with water to the concentration desired in each case.

Sheep heavily infested with sheep keds (*Melophagus ovinus*) are dipped in these preparations of active compound. The sheep are observed 1, 8 and 28 days after application of the active compound and the number of living and dead sheep keds is ascertained.

At various times after the treatment, the degree of destruction is determined; 100 percent means that all the keds, and 0 percent denotes that none of the keds, have been killed.

The active compound investigated, the concentrations tried, the parasite tested and the findings obtained can be seen from the following Table 14:

TABLE 14

(Sheep ked test)

| Active compound | Parasite | Concentration of active compound in ppm | Effect in % after days | | |
|---|---|---|---|---|---|
| | | | 1 | 8 | 28 |
| (1) $\langle\!\!\bigcirc\!\!\rangle$—C(=S)—O—P(OC$_2$H$_5$)$_2$ ‖ N—OC$_2$H$_5$ | Melophagus ovinus | 1000<br>750<br>500 | 100<br>100<br>100 | 100<br>100<br>100 | 100<br>100<br>100 |

EXAMPLE 16

Critical Concentration Test/Soil Insects

Test insect: *Phorbia brassicae* maggots in the soil

Solvent: 3 parts by weight acetone

Emulsifier: 1 part by weight alkylarylopolyglycol ether

To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg/l), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100 percent when all the test insects have been killed; it is 0 percent when exactly as many test insects are still alive as in the case of the control.

The active compounds, the amounts applied and the results can be seen from the following Table 15.

TABLE 15.—SOIL INSECTICIDES

[*Phorbia brassicae* maggots in the soil]

| Active compound | Concentration of active compound in p.p.m. | | | | Degree of destruction in percent | |
|---|---|---|---|---|---|---|
| | 20 | 10 | 5 | 2.5 | 1.25 | 0.625 |
| (1) C₆H₅–C(=NOC₂H₅)–O–P(=S)(OC₂H₅)₂ | 100 | 100 | 100 | 100 | 100 | 80 |
| (2) C₆H₅–C(=NOC₂H₅)–O–P(=S)(OCH₃)₂ | 100 | 100 | 100 | 95 | 50 | |
| (31) C₆H₅–C(=NOCH₃)–O–P(=O)(C₂H₅)(OC₂H₅) | 100 | 100 | 100 | 100 | 95 | 75 |
| (6) C₆H₅–C(=NOCH₃)–O–P(=S)(C₂H₅)(OC₂H₅) | 100 | 100 | 100 | 100 | 100 | 100 |
| (5) C₆H₅–C(=NOCH₃)–O–P(=S)(OC₂H₅)₂ | 100 | 100 | 100 | 100 | 98 | 50 |
| (7) 4-Cl-C₆H₄–C(=NOC₂H₅)–O–P(=S)(OC₂H₅)₂ | 100 | 100 | 100 | 100 | 100 | 95 |
| (8) 2-Cl-C₆H₄–C(=NOC₂H₅)–O–P(=S)(OC₂H₅)₂ | 100 | 100 | 100 | 100 | 75 | |
| (9) 3-Cl-C₆H₄–C(=NOC₂H₅)–O–P(=S)(OC₂H₅)₂ | 100 | 100 | 100 | 100 | 50 | |
| (10) 3-Br-C₆H₄–C(=NOC₂H₅)–O–P(=S)(OC₂H₅)₂ | 100 | 100 | 100 | 90 | 40 | |
| (11) 4-H₃C-C₆H₄–C(=NOC₂H₅)–O–P(=S)(OC₂H₅)₂ | 100 | 100 | 95 | 50 | | |
| (12) 4-O₂N-C₆H₄–C(=NOC₂H₅)–O–P(=S)(OC₂H₅)₂ | 100 | 100 | 98 | 50 | 50 | 50 |
| (13) 2-Cl-C₆H₄–C(=NOC₂H₅)–O–P(C₂H₅)(OC₂H₅) | 100 | 100 | 100 | 100 | 95 | |
| (14) 4-O₂N-C₆H₄–C(=NOC₂H₅)–O–P(=S)(C₂H₅)(OC₂H₅) | 100 | 100 | 75 | | | |
| (A) C₆H₅–C(=N–CH₃)–S–P(=S)(OC₂H₅)₂ (known) | 0 | | | | | |

EXAMPLE 17

Critical Concentration Test/Soil Insects
Test Insect: *Tenebrio Molitor* larvae
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg/l), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100 percent when all the test insects have been killed; it is 0 percent when exactly as many test insects are still alive as in the case of the control.

The active compounds, the amounts applied and the results can be seen from the following Table solution is washed twice with a 2N solution of sodium hydroxide and finally with water until there is a neutral reaction. After drying over sodium sulfate followed by distillation of the solvent, there remain behind 55 g (87 percent of theory) of 0,0-diethyl-0-(N-ethoxybenzimidoyl)-thionophosphoric acid ester as a light yellow-oil with the refractive index $n_D^{21}$ of 1.5228. Calculated for $C_{13}H_{20}NO_4PS$ (molecular weight 317.3)

|  | N | P | S |
|---|---|---|---|
| Found | 4.4% | 9.8% | 10.1% |
|  | 4.3% | 9.9% | 10.1% |

Analogously, the following compounds are prepared:

TABLE 16—SOIL INSECTICIDES
[Tenebrio molitor/larvae in the soil]

| Active compound | Concentration of active compound in p.p.m. | | | Degree of destruction in percent | |
|---|---|---|---|---|---|
|  | 40 | 20 | 10 | 5 | 2.5 |
| (5) [structure: phenyl-C(=NOCH₃)-O-P(=S)(OC₂H₅)₂] | 100 | 100 | 50 | | |
| (6) [structure: phenyl-C(=NOCH₃)-O-P(=S)(C₂H₅)(OC₂H₅)] | 100 | 100 | 100 | 50 | |
| (8) [structure: Cl-phenyl-C(=NOC₂H₅)-O-P(=S)(OC₂H₅)₂] | 100 | 100 | 75 | | |
| (10) [structure: Br-phenyl-C(=NOC₂H₅)-O-P(=S)(OC₂H₅)₂] | 100 | 100 | 75 | | |
| (13) [structure: Cl-phenyl-C(=NOC₂H₅)-O-P(=S)(C₂H₅)(OC₂H₅)] | 100 | 100 | 100 | 100 | 70 |
| (A) [structure: phenyl-C(=NCH₃)-S-P(=S)(CO₂H₅)₂] (known) | 0 | | | | |

The process of the present invention is illustrated in and by the following preparative Example.

EXAMPLE 18

(1) 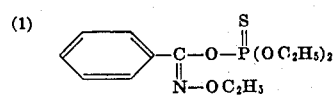
phenyl-C(=NOC₂H₅)-O-P(=S)(OC₂H₅)₂

36.5 g (0.22 mole, m.p. 63°C) of N-ethyloxybenzhydroxamic acid are dissolved in 150 cc of acetonitrile. After addition of 36 g (0.26 mole) of finely powdered potassium carbonate the mixture is heated to 50°C for 30 minutes, with stirring; at this temperature, 37.5 g (0.2 mole) of 0,0-diethylthionophosphoric acid ester chloride are added, the mixture is heated to 50°–60°C for 18 hours and, after cooling, it is poured into water. The separated oil is taken up in benzene, the benzene

| Constitution | (physical properties refraction; m.p./b.p.) | Yield (% of theory) |
|---|---|---|
| (2) phenyl-C(=NOC₂H₅)-O-P(=S)(OCH₃)₂ | $n_D^{21}$ = 1.5312 b.p. 94°C/0.01 mm Hg pale yellow oil | 32.0 |
| (3) phenyl-C(=NOC₂H₅)-O-P(=O)(OC₂H₅)₂ | $n_D^{22}$ = 1.5016 b.p. 105°C/0.01 mm Hg colorless oil | 73.6 |
| (4) phenyl-C(=NOC₂H₅)-O-P(=S)(C₂H₅)(OC₂H₅) | | |

| | | | | |
|---|---|---|---|---|
|(5)| Ph-C(=N-OCH₃)-O-P(=S)(OC₂H₅)₂ | 60.7 | (16) | 2-CH₃-C₆H₄-C(=N-OCH₃)-O-P(=S)(OCH₃)₂; $n_D^{20}$ = 1.5508; yellowish oil; 77 |

$n_D^{21}$ = 1.5320
b.p. 90°C/0.01 mm Hg
pale yellow oil (5) Ph—C(=N—OCH₃)—O—P(=S)(OC₂H₅)₂

$n_D^{21}$ = 1.5267
b.p. 103°C/0.01 mm Hg
pale yellow oil
crystallization in ice water (6) Ph—C(=N—OCH₃)—O—P(=S)(C₂H₅)(OC₂H₅)

$n_D^{21}$ = 1.5350
b.p. 95°C/0.01 mm Hg
yellow oil (7) 4-Cl—C₆H₄—C(=N—OC₂H₅)—O—P(=S)(OC₂H₅)₂

$n_D^{21}$ = 1.5262
yellowish oil (8) 2-Cl—C₆H₄—C(=N—OC₂H₅)—O—P(=S)(OC₂H₅)₂

$n_D^{21}$ = 1.5226
pale yellow oil (9) 3-Cl—C₆H₄—C(=N—OC₂H₅)—O—P(=S)(OC₂H₅)₂

$n_D^{21}$ = 1.5292
orange-colored oil

(10) 2-Br—C₆H₄—C(=N—OC₂H₅)—O—P(=S)(OC₂H₅)₂

$n_D^{21}$ = 1.5373
orange-colored oil

(11) 4-H₃C—C₆H₄—C(=N—OC₂H₅)—O—P(=S)(OC₂H₅)₂

$n_D^{21}$ = 1.5232
orange-colored oil

(12) 4-O₂N—C₆H₄—C(=N—OC₂H₅)—O—P(=S)(OC₂H₅)₂ m.p. 45°C

(13) 2-Cl—C₆H₄—C(=N—OC₂H₅)—O—P(=S)(C₂H₅)(OC₂H₅)

$n_D^{21}$ = 1.5361
pale yellow oil

(14) 4-O₂N—C₆H₄—C(=N—OC₂H₅)—O—P(=S)(C₂H₅)(OC₂H₅)

m.p. 78°C
light-yellow needles

(15) Ph—C(=N—OCH₃)—O—P(=S)(OCH₃)₂
60.7

(16) 2-CH₃—C₆H₄—C(=N—OCH₃)—O—P(=S)(OCH₃)₂
$n_D^{20}$ = 1.5508
yellowish oil   77

(17) 2-CH₃—C₆H₄—C(=N—OCH₃)—O—P(=S)(OC₂H₅)₂
$n_D^{21}$ = 1.5433
pale yellow oil   57,6

(18) 2-CH₃—C₆H₄—C(=N—OC₂H₅)—O—P(=S)(OCH₃)₂
$n_D^{21}$ = 1.5268
orange-colored oil   84,5

(19) 2-CH₃—C₆H₄—C(=N—OC₂H₅)—O—P(=S)(OC₂H₅)₂
$n_D^{20}$ = 1.5260
orange-colored oil   78,6

(20) 4-H₃C—C₆H₄—C(=N—OCH₃)—O—P(=S)(OCH₃)₂
$n_D^{22}$ = 1.5148
orange-colored oil   100

(21) 4-H₃C—C₆H₄—C(=N—OC₂H₅)—O—P(=S)(OCH₃)₂
$n_D^{22}$ = 1.5440
yellowish oil   61

(22) 2-Cl—C₆H₄—C(=N—OCH₃)—O—P(=S)(OCH₃)₂
$n_D^{21}$ = 1.5332
orange-colored oil   73,5

(23) 3-Cl—C₆H₄—C(=N—OCH₃)—O—P(=S)(OCH₃)₂
$n_D^{22}$ = 1.5469
orange-colored oil   79

(24) 4-Cl—C₆H₄—C(=N—OCH₃)—O—P(=S)(OCH₃)₂
$n_D^{22}$ = 1.5496
orange-colored oil   79

(25) 2-Br—C₆H₄—C(=N—OCH₃)—O—P(=S)(OCH₃)₂
$n_D^{22}$ = 1.5537
orange-colored oil   68

(26) 4-O₂N—C₆H₄—C(=N—OCH₃)—O—P(=S)(OCH₃)₂
m.p. 81°C   35

(27) 2-Cl—C₆H₄—C(=N—OC₂H₅)—O—P(=S)(OCH₃)₂
$n_D^{21}$ = 1.5352
clear yellow oil   95,5

41.1

84

91.4

85.8

96

60

82.4

95

97

Left column yields: 60.7, 41.1, 84, 91.4, 85.8, 96, 60, 82.4, 95, 97

(28)

$n_D^{21}$: 1,5374    67
clear yellow oil (29)

$n_D^{21}$: 1,5465    97
clear yellow oil (30)

$n_D^{21}$: 1,53 35    87,5
clear yellow oil

The other compounds specifically mentioned in the test Examples may also be prepared by processes analogous to that given above in Example 1.

It will be appreciated that the instant specification and examples are set forth by way of illustration and not limitation, and that various modifications and changes may be made without departing from the spirit and scope of the present invention.

What is claimed is:

1. 0-(N-alkoxy-benzimidoyl)-(thiono)phosphoric(-phosphonic) acid esters of the general formula in which
  R and $R_2$ each is an alkyl radical of one to six carbon atoms,
  $R_1$ is an alkyl or alkoxy radical of one to six carbon atoms,
  X is an oxygen or sulfur atom,
  n is an integer from 0 to 2, and
  Y is chlorine, bromine, an alkyl radical of one to four carbon atoms or a nitro group.

2. Compounds according to claim 1, in which R is a straight-chain or branched alkyl radical with one to four carbon atoms, $R_1$ is a straight-chain or branched alkyl or alkoxy radical with one to four carbon atoms; $R_2$ is methyl, ethyl or n- or isopropyl; n is 1 or 2, and Y is chlorine, bromine, methyl, ethyl or nitro.

3. The compound according to claim 1 wherein such compound is 0-ethyl-0-(N-methoxybenzimidoyl)-ethanethionophosphonic acid ester of the formula 4. The compound according to claim 1 wherein such compound is 0,0-diethyl-0-(N-ethoxy-4-nitrobenzimidoyl)-thionophosphoric acid ester of the formula 5. The compound according to claim 1 wherein such compound is 0-ethyl-0-(N-ethoxy-4-nitrobenzimidoyl)-ethanethionophosphonic acid ester of the formula 6. The compound according to claim 1 wherein such compound is 0,0-dimethyl-0-(N-ethoxy-2-chlorobenzimidoyl)-thionophosphoric acid ester of the formula 7. The compound according to claim 1 wherein such compound is 0,0-dimethyl-0-(N-ethoxy-2-bromobenzimidoyl)-thionophosphoric acid ester of the formula

* * * * *

PO-1050
(5/69)

UNITED STATES PATENT OFFICE
CERTIFICATE OF CORRECTION

Patent No. 3,760,041    Dated September 18, 1973

Inventor(s) Walter Lorenz et al

It is certified that error appears in the above-identified patent and that said Letters Patent are hereby corrected as shown below:

Col. 2, line 11, change "It" to --If--;

line 40, correct spelling of "mentioned";

line 51, change Oethyl to -- O-ethyl --.

Col. 6, line 38, change "hydro-carbons" to --hydrocarbons--.

Col. 21, line 11, after "Example" insert -- 11 --.

Col. 21, Table 10, Compound (2), change "(OCH )$_2$ to --(OCH$_3$)$_2$--.

Cols. 21,22, Table 10, Compound (9) - last column, delete "100", second occurrence.

Cols. 21, 22, Table 10, Compound 10 - last column, change ">50" to -- <50 --, third occurrence.

Cols. 27, 28, Table 15, Compound (12), under heading "0.625", delete "50";

Compound (13), under heading "0.625" insert -- 50 --.

Col. 29, Table 16, in the heading - insert -- [ -- before "Tenebrio

Col. 33, Compound (28), correct formula to read:

Signed and sealed this 29th day of October 1974.

(SEAL)
Attest:

McCOY M. GIBSON JR.
Attesting Officer

C. MARSHALL DANN
Commissioner of Patents